United States Patent
Fisher et al.

(10) Patent No.: US 7,418,562 B2
(45) Date of Patent: Aug. 26, 2008

(54) APPARATUS AND METHOD TO ASSIGN ONE OR MORE STORAGE CONSTRUCT NAMES TO A LOGICAL VOLUME

(75) Inventors: James A. Fisher, Tucson, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/230,514

(22) Filed: Aug. 29, 2002

(65) Prior Publication Data
US 2004/0044825 A1    Mar. 4, 2004

(51) Int. Cl.
*G06F 12/00* (2006.01)

(52) U.S. Cl. .................................. 711/161; 711/112

(58) Field of Classification Search ............ 711/112, 711/114, 203, 111, 161; 707/204
See application file for complete search history.

(56) References Cited

U.S. PATENT DOCUMENTS

| | | | |
|---|---|---|---|
| 5,018,060 A | 5/1991 | Gelb et al. | |
| 5,164,909 A | 11/1992 | Leonhardt et al. | 364/478 |
| 5,479,631 A | 12/1995 | Manners et al. | 395/465 |
| 5,506,986 A * | 4/1996 | Healy | 707/204 |
| 5,606,689 A | 2/1997 | Nakagawa | 395/622 |
| 5,809,511 A | 9/1998 | Peake | 707/204 |
| 5,911,148 A | 6/1999 | Anglin et al. | 711/111 |
| 6,195,730 B1 | 2/2001 | West | 711/121 |
| 2002/0004857 A1 | 1/2002 | Arakawa et al. | 710/1 |

FOREIGN PATENT DOCUMENTS

WO    PCT/US98/14247    9/1998

* cited by examiner

*Primary Examiner*—Kevin Ellis
*Assistant Examiner*—Jared I Rutz
(74) *Attorney, Agent, or Firm*—Dale F. Regelman; Quarles & Brady LLP (57) ABSTRACT

A method to assign one or more new storage construct names to one or more logical volumes using an operator input station capable of communicating with a virtual tape system, where that virtual tape system includes a plurality of existing logical volumes and a database which includes a plurality of logical volume records. The method first defines one or more new storage construct names, associates one or more storage actions with each of those new storage construct names, and saves the new storage construct names and the associated storage actions in the database. The method then enters, using the operator input station, a range of logical volumes, selects one or more new storage construct names, associates those new storage construct name to the range of logical volumes. The method then determines if the range of logical volumes comprises existing or new logical volumes. If the range of logical volumes comprises existing logical volumes, then the method modifies the logical volume records for that range of logical volumes to include the new storage construct names. If the range of logical volumes comprises new logical volumes, then the method creates new database records for that range of logical volumes comprising the new storage construct name.

21 Claims, 5 Drawing Sheets

APPARATUS AND METHOD TO ASSIGN ONE OR MORE STORAGE CONSTRUCT NAMES TO A LOGICAL VOLUME

FIELD OF THE INVENTION

Applicant's invention relates to an apparatus and method to assign one or more storage construct names to one or more logical volumes. In certain embodiments, the one or more logical volumes are maintained in a virtual tape system.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM 3494 Media Storage Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method and apparatus for one or more new storage construct names to be associated with one or more logical volumes using an operator input station capable of communicating with a virtual tape system, where that virtual tape system includes a plurality of existing logical volumes and a database which includes a plurality of logical volume records. Applicants' method first defines one or more new storage construct names, associates one or more storage actions with those new storage construct names, and saves the new storage construct names and the associated storage actions in the database.

Applicants' method then enters, using the operator input station, a range of logical volumes, selects one or more new storage construct names, associates those one or more new storage construct names to the range of logical volumes. Applicants' method then determines if the range of logical volumes comprises existing or new logical volumes. If the range of logical volumes comprises existing logical volumes, then Applicants' method modifies the logical volume records for that range of logical volumes to include the new storage construct names. If the range of logical volumes comprises new logical volumes, then Applicants' method creates new database records for that range of logical volumes comprising the new storage construct names.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
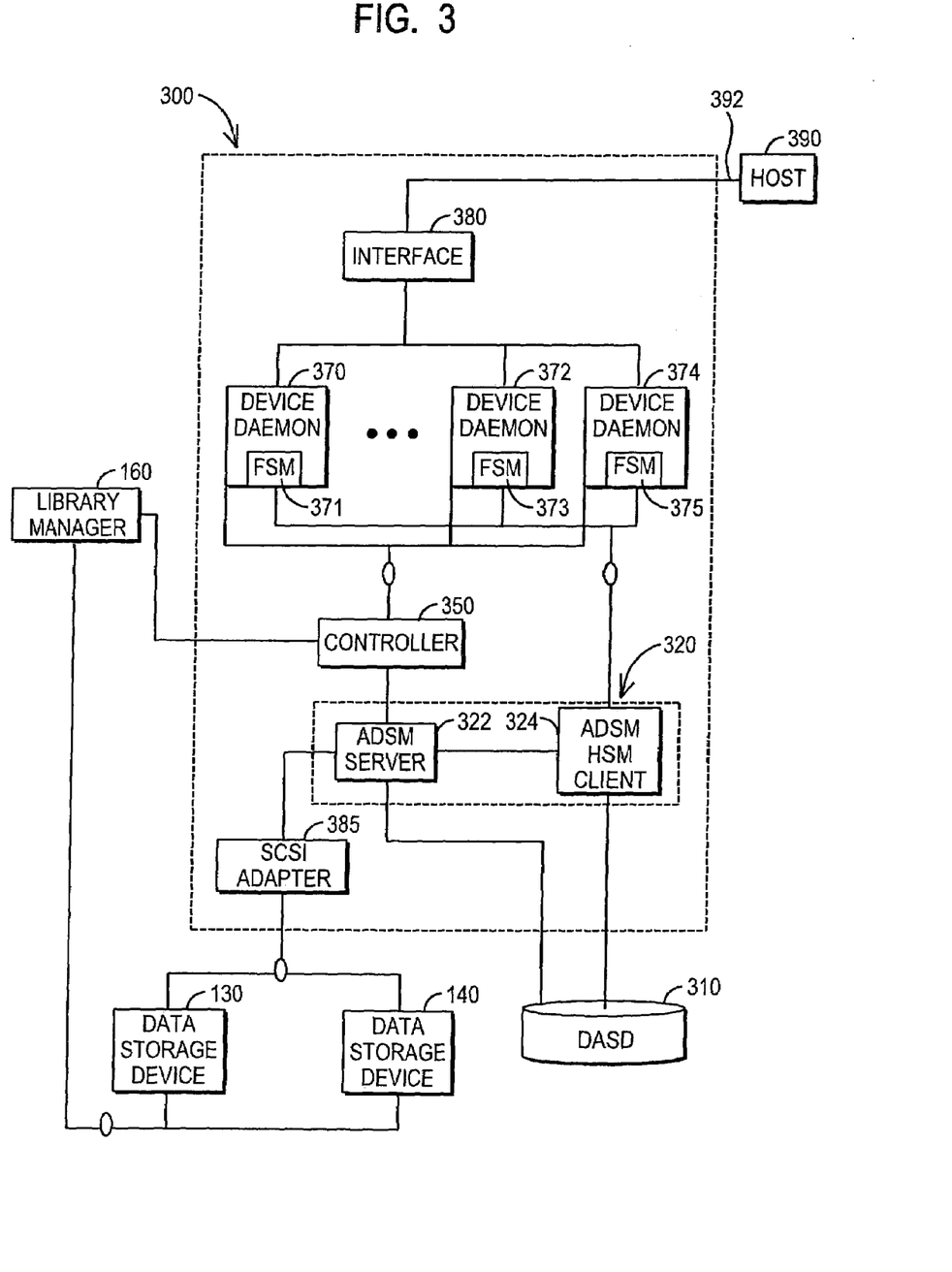
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "Z/OS V1R3 DFSMS Introduction," IBM document no. SC26-7397-01 2002, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
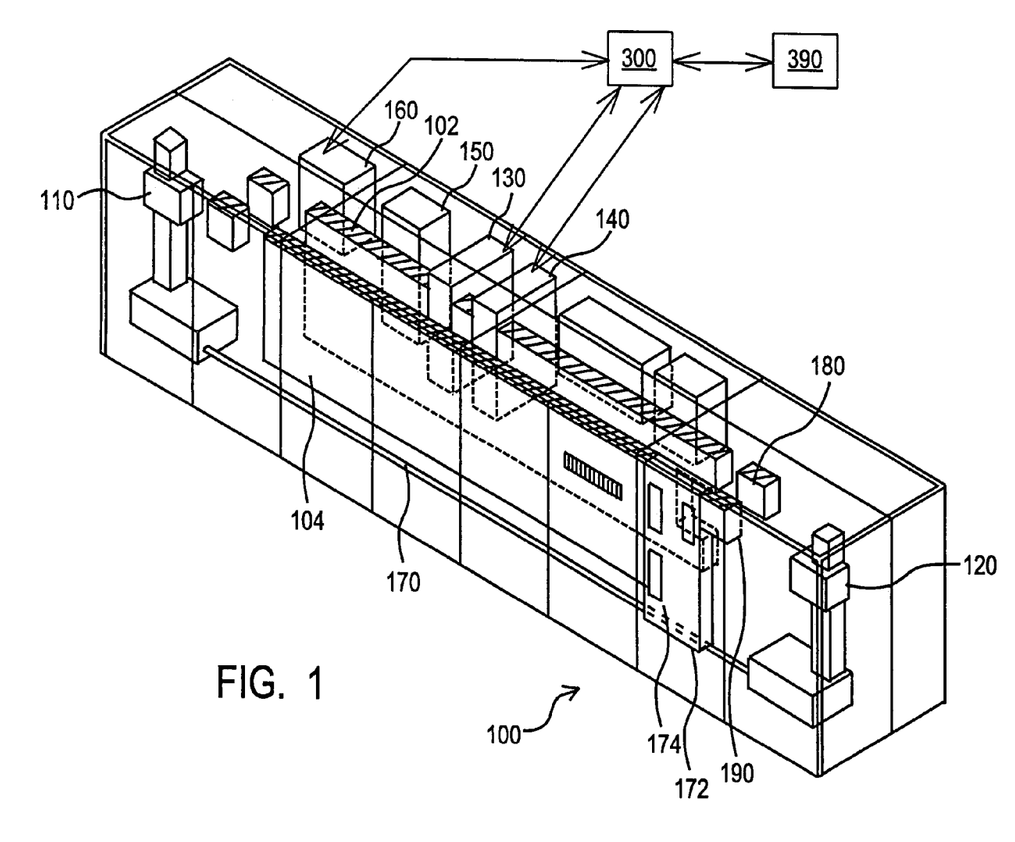
FIG. 1 is a perspective view of a first embodiment of Applicant's data storage and retrieval system.
Figure 2:
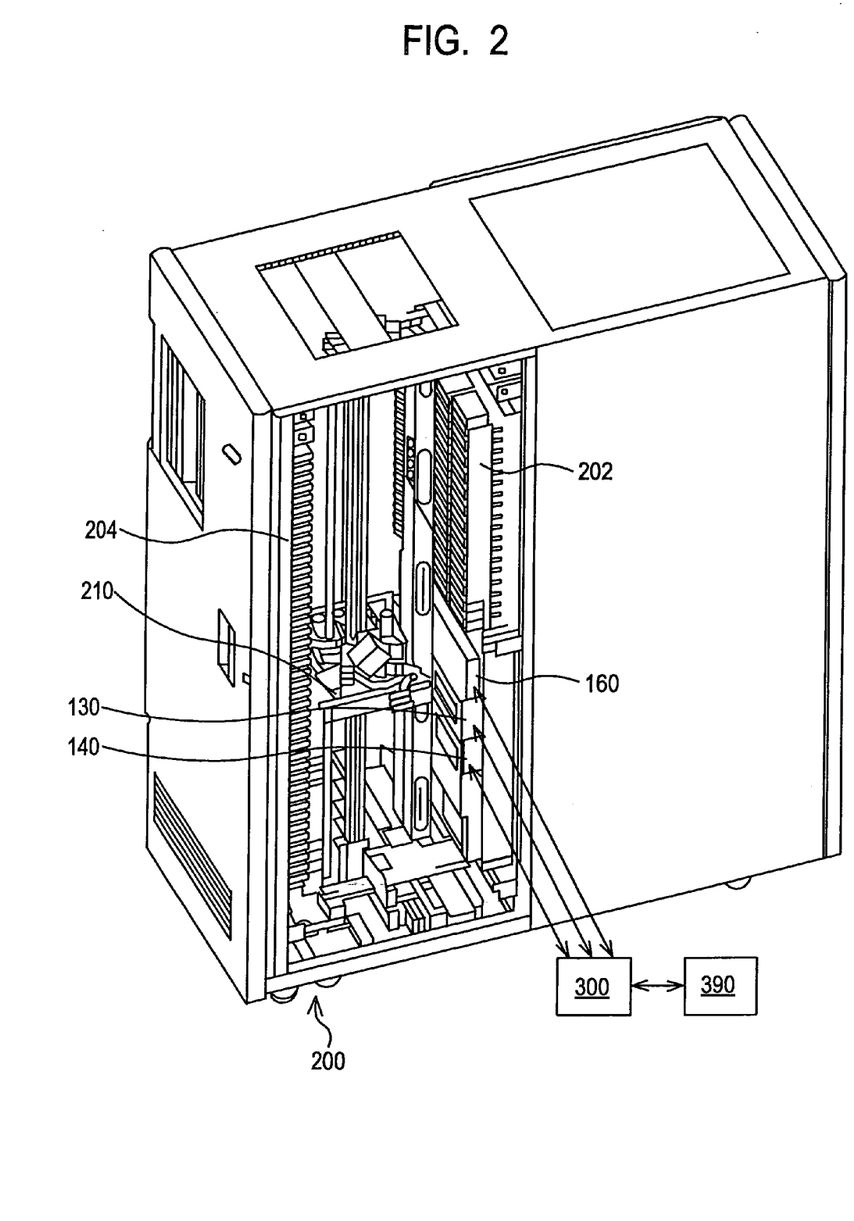
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

The pending application entitled "Apparatus And Method To Maintain Information Using A Plurality Of Storage Construct Names," assigned to the common assignee hereof, and hereby incorporated herein, describes a method wherein a host computer in communication with a virtual tape system assigns one or more storage construct names to a dataset, and then provides that dataset and those one or more storage construct names to the virtual tape system. That host computer includes a set of Automatic Class Selection ("ACS") routines which establish the data management policies for the new dataset, for one or more virtual volumes comprising that dataset, for writing those one or more virtual volumes to one or more physical volumes, and for management of those one or more volumes.

These ACS routines determine which information storage policies are assigned to each logical volume maintained by that host computer. These information policies include one or more data class policies, one or more storage class policies, one or more management class policies, and one or more storage group policies.

Data class storage policies include, for example, which recording format to use when writing physical volumes, which media cartridge to use, and the like. Storage class storage policies include, for example, whether to give the virtual volume preference to be removed or maintained on a DASD, such as DASD 310 (FIG. 3). Management class storage policies include, for example, whether a copy of the logical volume should be made immediately or whether to defer making that copy, selecting one or more information storage media to use when writing physical volumes, allocating a secondary stacked volume pool, and the like. Storage group storage policies include, for example, specifying a primary stacked volume pool for the logical volume, and the like.

After an ACS routine establishes a certain storage management policy for a logical volume, that ACS routine then assigns a storage construct name which indicates the selected storage management policy. In certain embodiments, each such storage construct name comprises an 8 byte designator.

This invention includes a method to manually assign one or more storage construct names to a logical volume, and to provide those one or more storage construct names to Applicants' virtual tape system using an operator input station. Using this invention, a user can realize the benefits of Applicants' outboard storage management method, i.e. a method whereby a virtual tape system rather than a host computer maintains storage attributes for one or more logical volumes, even if the user's host computer does not include any ACS routines or capability.

Applicants' virtual tape system 300 (FIG. 3) includes a library manager, such a library manager 160 (FIGS. 1, 2). That library manager includes a library inventory. That library inventory comprises a database. That inventory database includes fields indicating the storage management policies selected for each logical volume maintained on the virtual tape system. In certain embodiments, Applicants' virtual tape system includes a library database comprising a data class attribute field, a storage class attribute field, a management class attribute field, and a storage group attribute field.

Storage actions associated with each storage construct name are defined for a virtual tape system using an operator input station, such as operator input station 150 (FIG. 1), disposed in that virtual tape system. In certain embodiments, the operator input station is integral with the virtual tape server. In certain embodiments, the operator input station is integral with a data storage and retrieval system. In certain embodiments, the operator input station is integral with a host computer. In certain embodiments, the operator input station is remote from the virtual tape server, the host computer, and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

Figure 4:
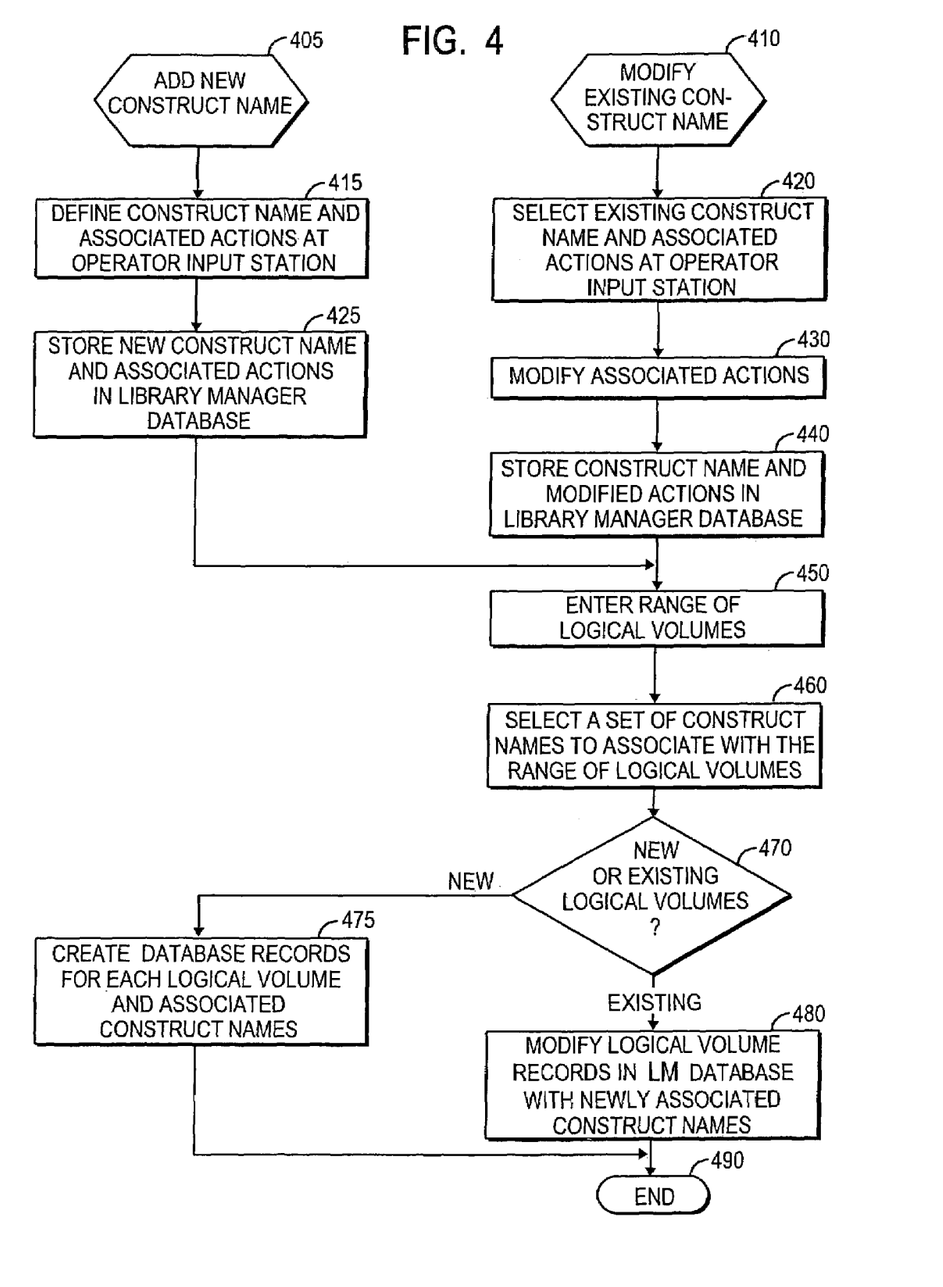
FIG. 4 is a flow chart summarizing the steps in various embodiments of Applicants' method.

FIG. 4 summarizes the steps in various embodiments of Applicants' method. Referring now to FIG. 4, certain embodiments of Applicants' method begin at step 405, wherein a user adds a new storage construct name. In step 415, the user defines the new construct names and associates one or more storage actions with that new construct name. Step 415 is performed using a local operator input station, such as operator input station 150 (FIG. 1). In certain embodiments, the operator input station is remote from Applicants' VTS and data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like. In step 425, Applicants' method stores the one or more new construct names and associated storage actions in the Library Manager database. This embodiment of Applicants' method transitions from step 425 to step 450.

Other embodiments of Applicants' method include modifying existing storage construct names. These embodiments begin at step 410. In step 420, the user selects one or more existing construct names and their associated actions using a local or a remote operator input station. In step 430, the user modifies the associated storage actions for each of the one or more construct names of step 420. Step 430 is performed using a local or a remote operator input station. In step 440, Applicants' method stores the one or more construct names and the associated modified storage actions in the Library Manager database. This embodiment of Applicants' method transitions from step 440 to step 450.

In step 450, the user enters a range of logical volumes. In certain embodiments, this range of logical volumes includes existing logical volumes maintained by Applicants' virtual tape system. In certain embodiments, the range of logical volumes includes new logical volumes. Step 450 is performed using a local or a remote operator input station. In step 460, the user selects a set of construct names to associate with the range of logical volumes selected in step 450. Step 460 is performed using a local or a remote operator input station. Applicants' method transitions from step 460 to step 470 wherein Applicants' method determines if the associated logical volumes comprise new or existing volumes.

If Applicants' method determines in step 470 that the logical volumes of step 450 comprise existing volumes, then Applicants' method transitions from step 470 to step 480 wherein Applicants' method modifies one or more logical volume records in the Library Manager to include the newly associated construct names, where those one or more records correspond to the logical volumes of step 450. This embodiment of Applicants' method transitions from step 480 to step 490 and ends.

If Applicants' method determines in step 470 that the logical volumes of step 450 comprise new logical volumes, then Applicants' method transitions from step 470 to step 475 wherein Applicants' method creates database records for each new logical volume, where those new records include the associated construct names. This embodiment of Applicants' method transitions from step 475 to step 490 and ends.

Figure 5:
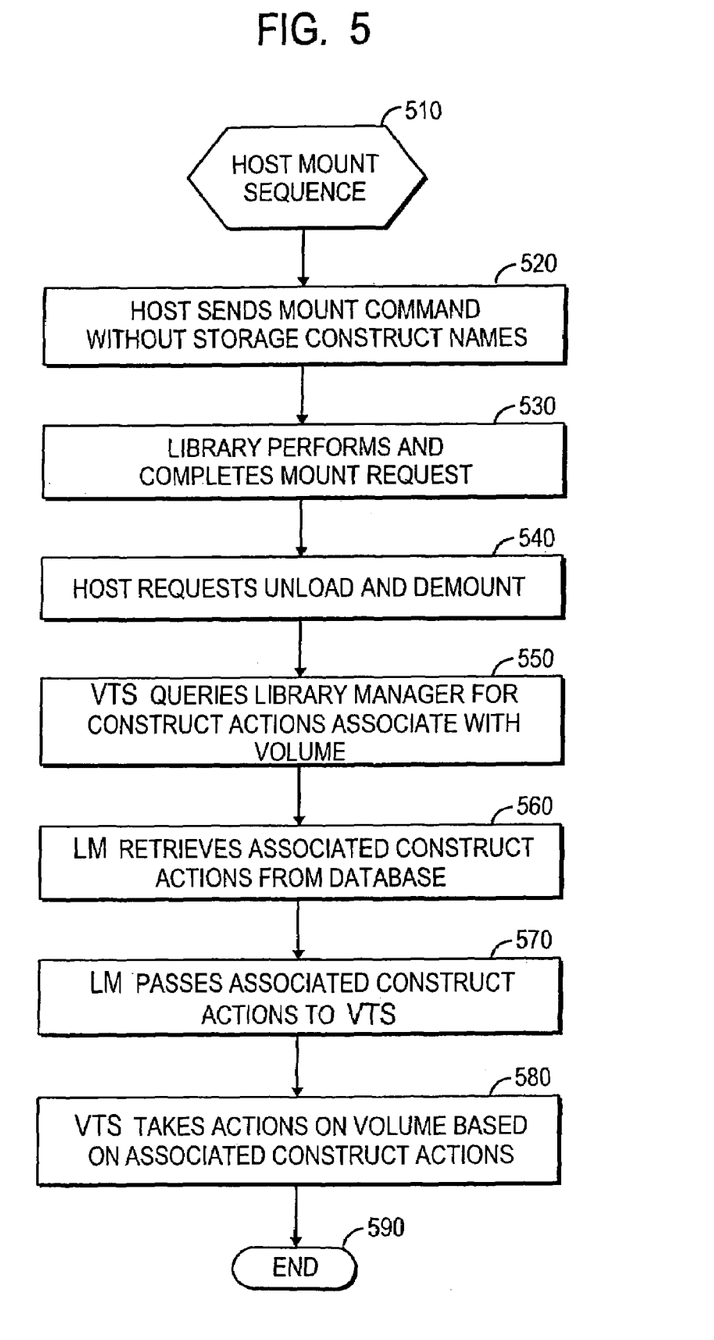
FIG. 5 is a flow chart summarizing additional steps in certain embodiments of Applicants' method.

FIG. 5 summarizes the steps of Applicants' method to utilize the storage construct names created and associated with one or more logical volumes. Referring now to FIG. 5, Applicants' method starts at step 510 wherein Applicants' method maintains one or more logical volumes in a virtual tape system, where those one or more logical volumes are associated with one or more storage construct names defined using an operator input station. In step 520, a host computer provides a mount command for a logical volume to Applicants' VTS, where that mount command includes no storage construct names. In step 530, Applicants' method performs and completes the mount request of step 530. In step 540, the host computer requests Applicants' VTS unload and demount the logical volume. In step 550, the VTS queries the Library Manager for storage actions associated with the logical volume. In step 560, the Library Manager retrieves the associated storage actions from the library database. In step 570, the Library Manager provides those associated storage actions to the VTS. In step 580, the VTS performs one or more storage actions based upon the storage construct actions provided in step 570. Applicants' method transitions from step 580 to step 590 and ends.

The steps of Applicants' method recited in FIGS. 4 and 5 may be implemented separately. For example, one embodiment uses steps 405, 415, and 425. Another embodiment uses steps 410, 420, 430, and 440. A different embodiment uses steps 450, 460, 470, 475, and 480. In certain embodiments of Applicants' method, the individual steps recited in FIGS. 4 and 5 may be combined, eliminated, or reordered.

Applicants' invention includes an article of manufacture comprising a computer useable medium having computer readable program code disposed therein to create one or more new storage construct names using an operator input station. Applicants' invention includes an article of manufacture comprising a computer useable medium having computer readable program code disposed therein to modify one or more existing storage construct names using an operator input station. Applicants' invention includes an article of manufacture comprising a computer useable medium having computer readable program code disposed therein to assign one or more storage construct names to one or more logical volumes using an operator input station.

Applicants' invention further includes computer program products embodied as program code stored in one or more memory devices, such as a magnetic disk, a magnetic tape, or other non-volatile memory device, to create one or more new storage construct names using an operator input station. Applicants' invention further includes computer program products embodied as program code stored in one or more memory devices, such as a magnetic disk, a magnetic tape, or other non-volatile memory device, to modify one or more existing storage construct names using an operator input station. Applicants' invention further includes computer program products embodied as program code stored in one or more memory devices, such as a magnetic disk, a magnetic tape, or other non-volatile memory device, to assign one or more storage construct names to one or more logical volumes using an operator input station.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to define a new storage construct name using an operator input station capable of communicating with a virtual tape system, wherein said virtual tape system includes a database, comprising the steps of:
   providing a virtual tape system capable of communicating with an operation input station and a host computer, wherein said host computer does not comprise one or more Automatic Class Selection routines;
   defining using said operator input station a new storage construct name;
   associating using said operator input station one or more storage actions with said new storage construct name;
   saving said new storage construct name and said associated storage actions in said database.

2. The method of claim 1, wherein said operator input station is integral with said virtual tape system.

3. The method of claim 1, wherein said operator input station is remote from said virtual tape system.

4. A method to assign one or more storage construct names to one or more logical volumes using an operator input station capable of communicating with a virtual tape system, wherein said virtual tape system includes a plurality of existing logical volumes and a database comprising a plurality of logical volume records, comprising the steps of:
   entering using said operator input station a range of logical volumes;
   selecting using said operator input station one or more storage construct names;
   associating using said operator input station said one or more storage construct names to said range of logical volumes;
   determining if said range of logical volumes comprises existing or new logical volumes;
   operative if said range of logical volumes comprises existing logical volumes, modifying said logical volume records to include said associated storage construct names;
   operative if said range of logical volumes comprises new logical volumes, creating new database records for said range of logical volumes comprising said associated storage construct names.

5. The method of claim 4, wherein said database further includes one or more existing storage construct names and associated storage actions, further comprising the steps of:
   selecting using said operator input station one or more of said plurality of said existing storage construct names, where each of those one or more existing storage construct names has one or more storage actions associated therewith;
   modifying using said operator input station one or more of said associated storage actions; and
   storing in said database said one or more existing construct names and said modified associated storage actions.

6. The method of claim 4, further comprising the steps of:
   defining a new storage construct name;
   associating one or more storage actions with said new storage construct name;
   saving said new storage construct name and said associated storage actions in said database.

7. A method to assign one or more storage construct names to one or more logical volumes using an operator input station capable of communicating with a virtual tape system, wherein said virtual tape system includes a plurality of existing logical volumes and a database comprising a plurality of logical volume records, comprising the steps of:
   defining using said operator input station one or more new storage construct names;
   associating using said operator input station one or more storage actions with said new storage construct name;
   saving said new storage construct name and said associated storage actions in said database;
   entering using said operator input station a range of logical volumes;
   selecting using said operator input station said new storage construct name;
   associating using said operator input station said new storage construct name to said range of logical volumes;
   determining if said range of logical volumes comprises existing or new logical volumes;
   operative if said range of logical volumes comprises existing logical volumes, modifying said logical volume records to include said new storage construct name;
   operative if said range of logical volumes comprises new logical volumes, creating new database records for said range of logical volumes comprising said new storage construct name.

8. An article of manufacture comprising a computer readable medium having computer readable program code disposed therein to define a new storage construct name using an operator input station capable of communicating with a virtual tape system, wherein said virtual tape system includes a database, and wherein said virtual tape system is capable of communicating with host computer that does not comprise one or more Automatic Class Selection routines, the computer readable program code comprising a series of computer readable program steps to effect:

receiving from a user via said operator input station a new storage construct name and associated one or more storage actions;

saving said new storage construct name and said associated storage actions in said database.

9. The article of manufacture of claim 8, wherein said operator input station is integral with said virtual tape system.

10. The article of manufacture of claim 9, wherein said operator input station is remote from said virtual tape system.

11. An article of manufacture comprising a computer readable medium having computer readable program code disposed therein to assign one or more storage construct names to one or more logical volumes using an operator input station capable of communicating with a virtual tape system, wherein said virtual tape system includes a plurality of existing logical volumes and a database comprising a plurality of logical volume records, the computer readable program code comprising a series of computer readable program steps to effect:

receiving from said operator input station a range of logical volumes;

receiving from said operator input station one or more selected storage construct names;

associating said one or more storage construct names to said range of logical volumes;

determining if said range of logical volumes comprises existing or new logical volumes;

operative if said range of logical volumes comprises existing logical volumes, modifying said logical volume records to include said associated storage construct names;

operative if said range of logical volumes comprises new logical volumes, creating new database records for said range of logical volumes comprising said associated storage construct names.

12. The article of manufacture of claim 11, said computer readable program code further comprising a series of computer readable program steps to effect:

retrieving one or more storage actions associated with one or more selected storage construct names;

modifying one or more of said associated storage actions; and storing in said database said modified associated storage actions.

13. The article of manufacture of claim 11, wherein said virtual tape system further comprises a library inventory, said computer readable program code further comprising a series of computer readable program steps to effect:

defining a new storage construct name;

associating one or more storage actions with said new storage construct name;

saving said new storage construct name and said associated storage actions in said database.

14. An article of manufacture comprising a computer readable medium having computer readable program code disposed therein to assign one or more storage construct names to one or more logical volumes using an operator input station capable of communicating with a virtual tape system, wherein said virtual tape system includes a plurality of existing logical volumes and a database comprising a plurality of logical volume records, the computer readable program code comprising a series of computer readable program steps to effect:

receiving via said operator input station a new storage construct name;

associating one or more storage actions with said new storage construct name;

saving said new storage construct name and said associated storage actions in said database;

receiving via said operator input station a range of logical volumes;

selecting said new storage construct name;

associating said new storage construct name to said range of logical volumes;

determining if said range of logical volumes comprises existing or new logical volumes;

operative if said range of logical volumes comprises existing logical volumes, modifying said logical volume records to include said new storage construct name;

operative if said range of logical volumes comprises new logical volumes, creating new database records for said range of logical volumes comprising said new storage construct name.

15. A computer program product written to a computer readable medium having computer readable program code embodied therein to define a new storage construct name using an operator input station capable of communicating with a virtual tape system, wherein said virtual tape system includes a database, and wherein said virtual tape system is capable of communicating with host computer that does not comprise one or more Automatic Class Selection routines, comprising:

computer readable program code which causes said programmable computer processor to receive from a user via said operator input station a new storage construct name and associated one or more storage actions;

computer readable program code which causes said programmable computer processor to save said new storage construct name and said associated storage actions in said database.

16. The computer program product of claim 15, wherein said operator input station is integral with said virtual tape system.

17. The computer program product of claim 15, wherein said operator input station is remote from said virtual tape system.

18. A computer program written to a computer readable medium having computer readable program code embodied therein to assign one or more storage construct names to one or more logical volumes using an operator input station capable of communicating with a virtual tape system, wherein said virtual tape system includes a plurality of existing logical volumes and a database comprising a plurality of logical volume records, comprising:

computer readable program code which causes said programmable computer processor to receive from said operator input station a range of logical volumes;

computer readable program code which causes said programmable computer processor to receive from said operator input station one or more selected storage construct names;

computer readable program code which causes said programmable computer processor to associate said one or more storage construct names to said range of logical volumes;

computer readable program code which causes said programmable computer processor to determine if said range of logical volumes comprises existing or new logical volumes;

computer readable program code which, if said range of logical volumes comprises existing logical volumes, causes said programmable computer processor to modify said logical volume records to include said associated storage construct names;

computer readable program code which, if said range of logical volumes comprises new logical volumes, causes said programmable computer processor to create new database records for said range of logical volumes comprising said associated storage construct names.

19. The computer program product of claim 18, further comprising:

computer readable program code which causes said programmable computer processor to retrieve from said database one or more of said plurality of existing storage construct names, where each of those one or more existing storage construct names has one or more storage actions associated therewith;

computer readable program code which causes said programmable computer processor to retrieve one or more storage actions associated with an existing storage construct name;

computer readable program code which causes said programmable computer processor to receive modifications to said one or more associated storage actions; and computer readable program code which causes said programmable computer processor to store in said database said existing construct name and said modified associated storage actions.

20. The computer program product of claim 19, further comprising:

computer readable program code which causes said programmable computer processor to receive from a user via said operator input station a new storage construct name and associated one or more storage actions;

computer readable program code which causes said programmable computer processor to save said new storage construct name and said associated storage actions in said database.

21. A computer program product written to a computer readable medium having computer readable program code embodied therein to assign one or more storage construct names to one or more logical volumes using an operator input station capable of communicating with a virtual tape system, wherein said virtual tape system includes a plurality of existing logical volumes and a database comprising a plurality of logical volume records, comprising:

computer readable program code which causes said programmable computer processor to retrieve from said database one or more of said plurality of existing storage construct names, where each of those one or more existing storage construct names has one or more storage actions associated therewith;

computer readable program code which causes said programmable computer processor to provide said one or more existing storage construct names and associated storage actions to a user via said operator input station computer readable program code which causes said programmable computer processor to receive modifications to one or more of said associated storage actions;

computer readable program code which causes said programmable computer processor to store in said database said existing construct names and said modified associated storage actions computer readable program code which causes said programmable computer processor to receive from said operator input station a range of logical volumes;

computer readable program code which causes said programmable computer processor to retrieve one or more selected storage construct names;

computer readable program code which causes said programmable computer processor to associate said one or more selected storage construct names to said range of logical volumes;

computer readable program code which causes said programmable computer processor to determine if said range of logical volumes comprises existing or new logical volumes;

computer readable program code which, if said range of logical volumes comprises existing logical volumes, causes said programmable computer processor to modify said logical volume records to include said associated storage construct names;

computer readable program code which, if said range of logical volumes comprises new logical volumes, causes said programmable computer processor to create new database records for said range of logical volumes comprising said associated storage construct names.

* * * * *